June 18, 1935.  H. D. CHURCH  2,005,312
MOTOR VEHICLE
Filed Aug. 22, 1932   15 Sheets-Sheet 1
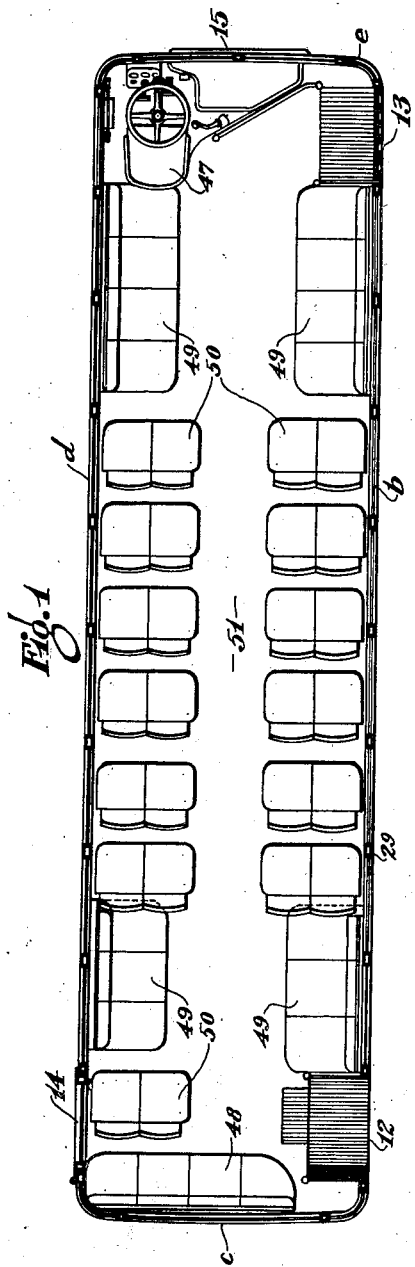
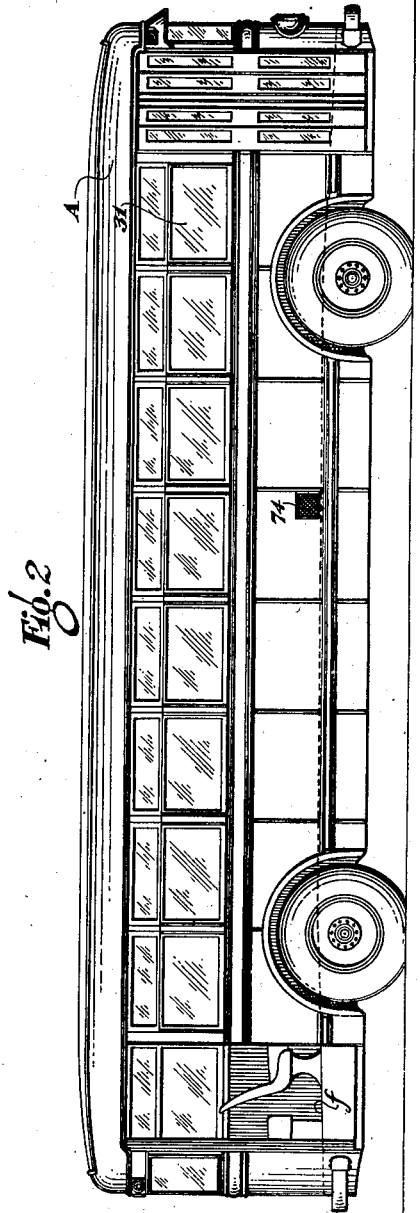
INVENTOR
HAROLD D. CHURCH.
BY RM Cooper
ATTORNEY

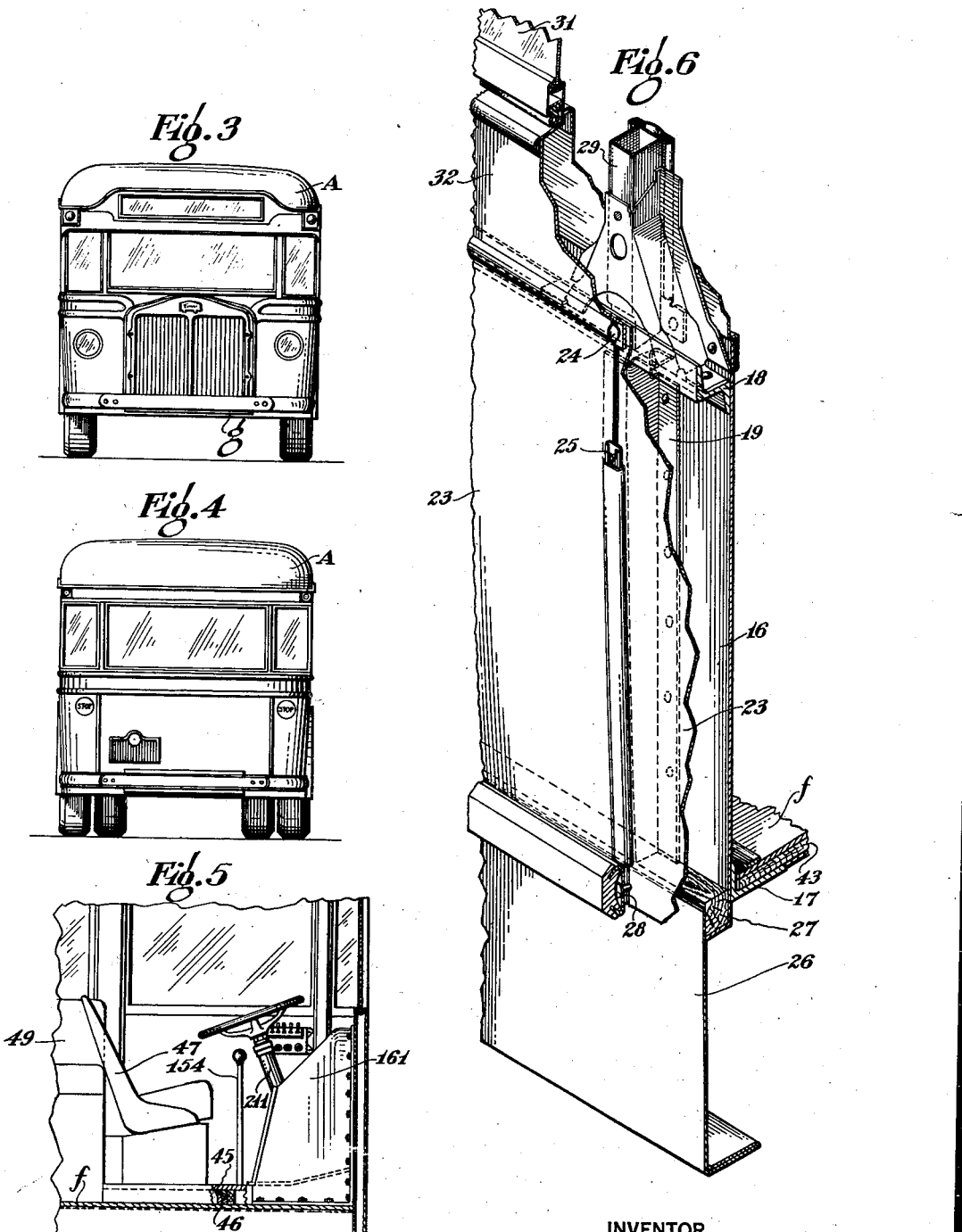

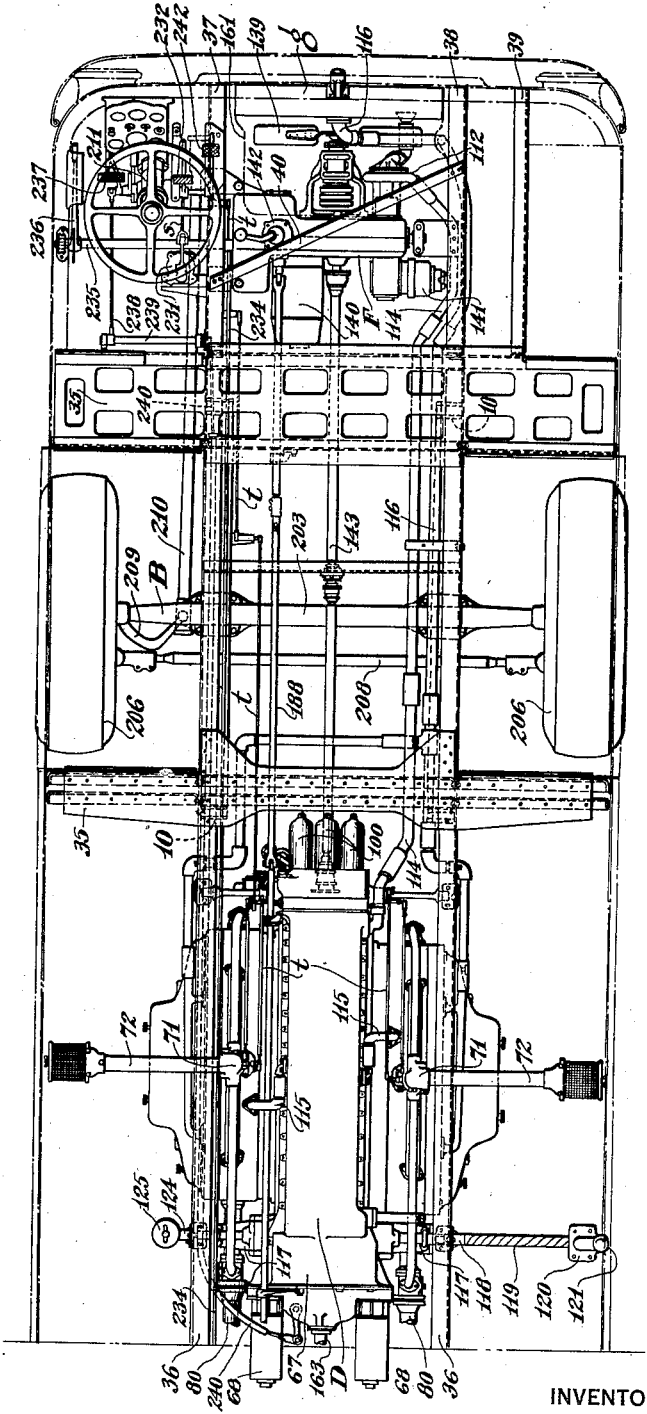

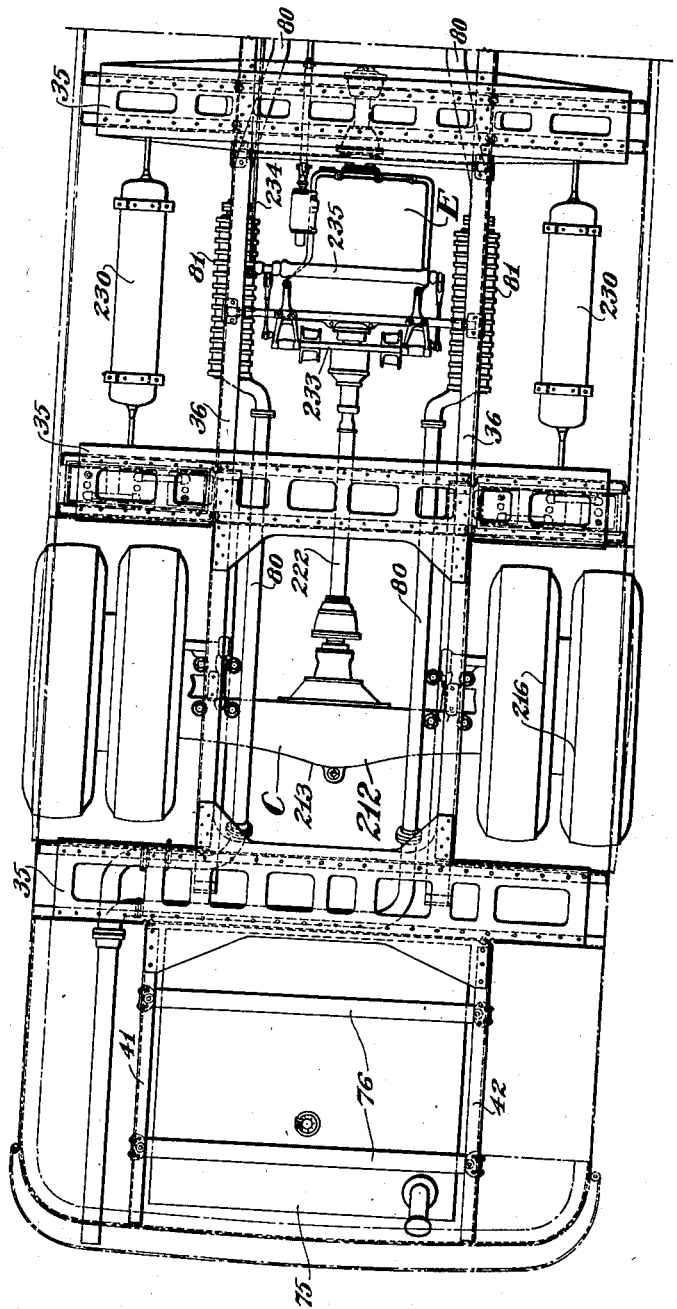

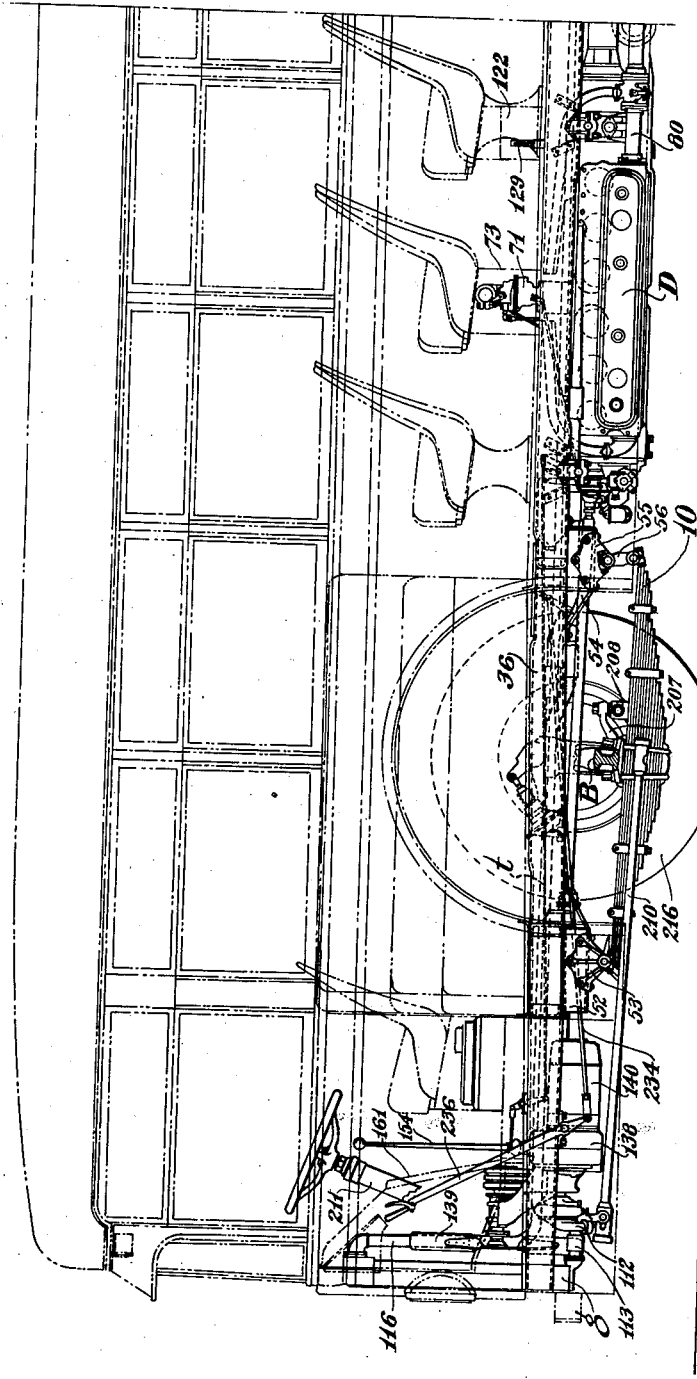

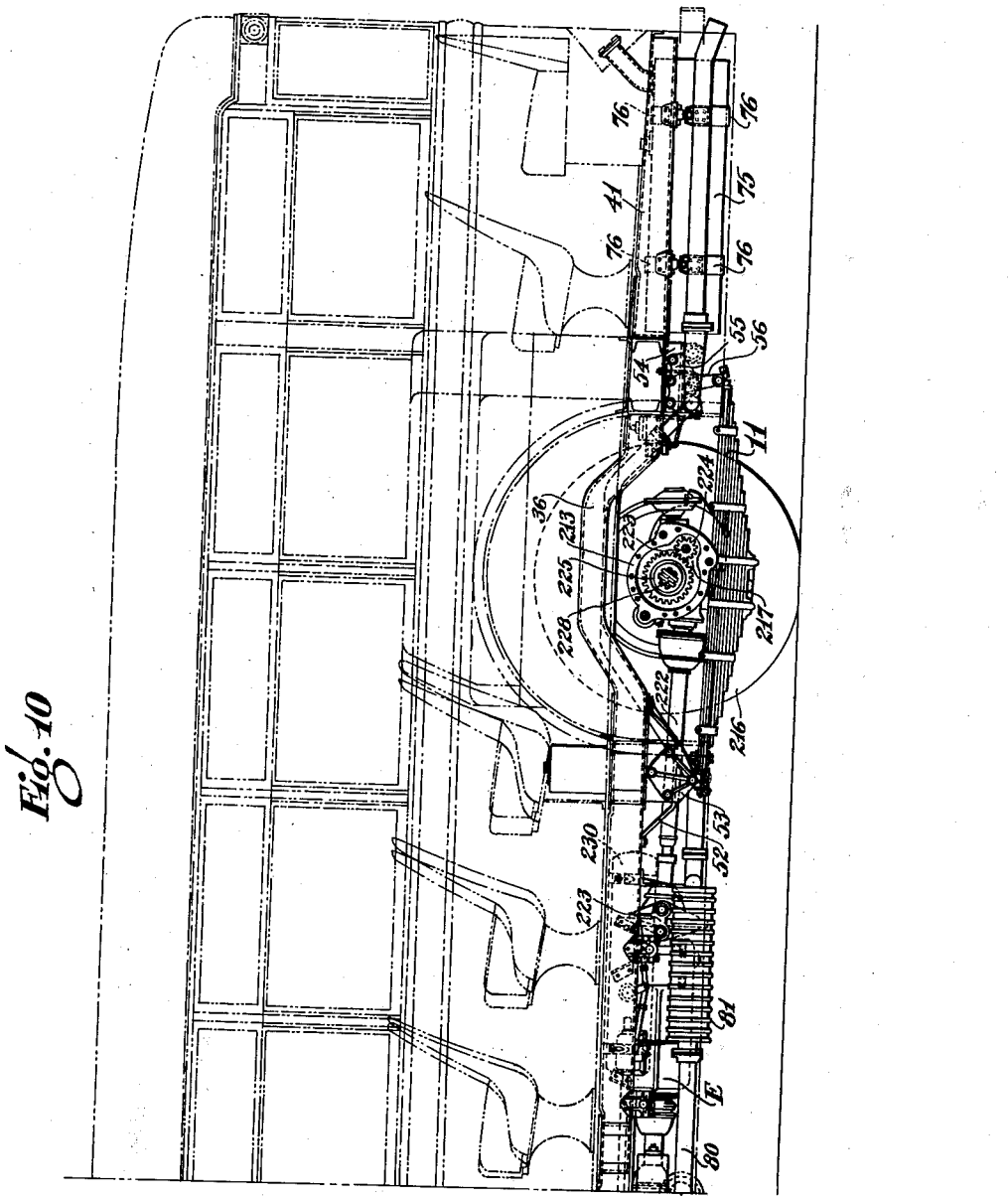

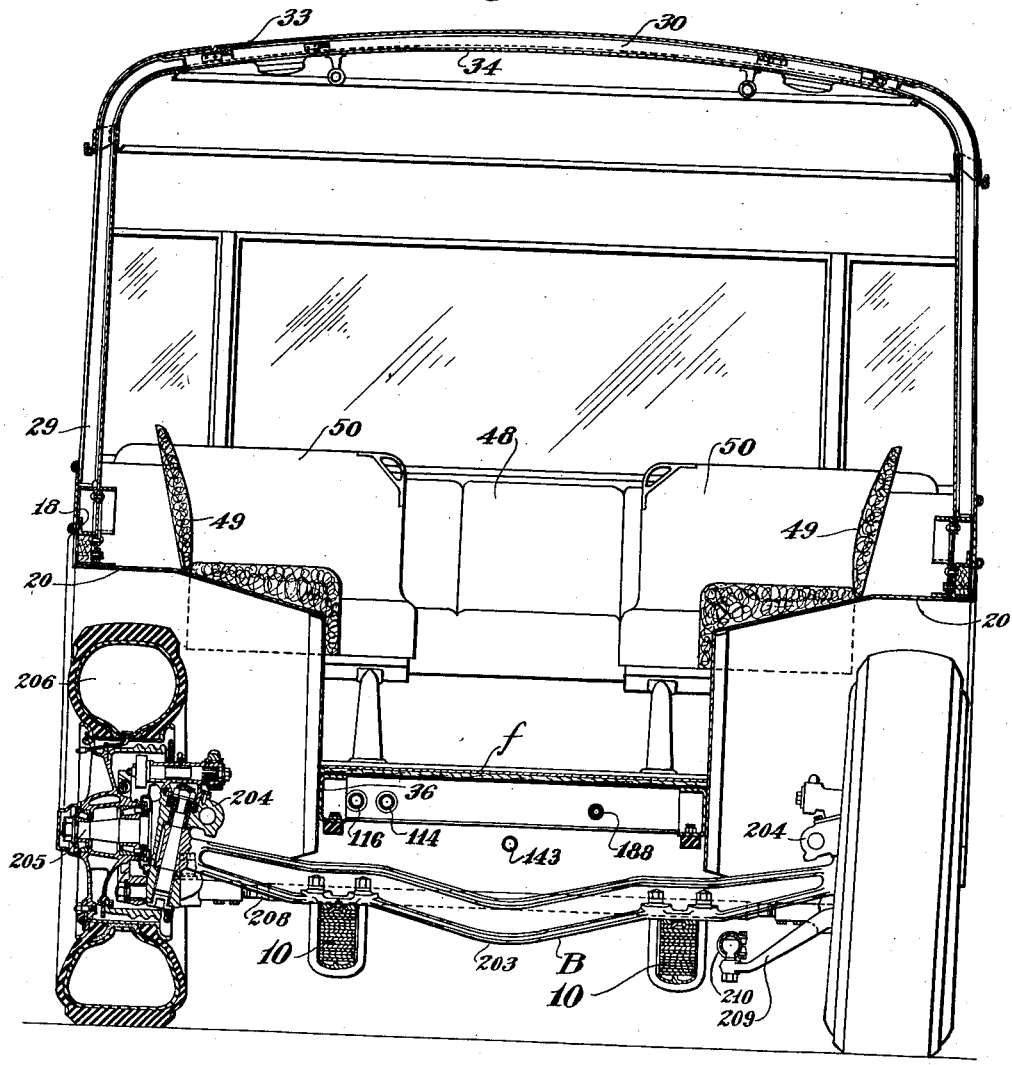

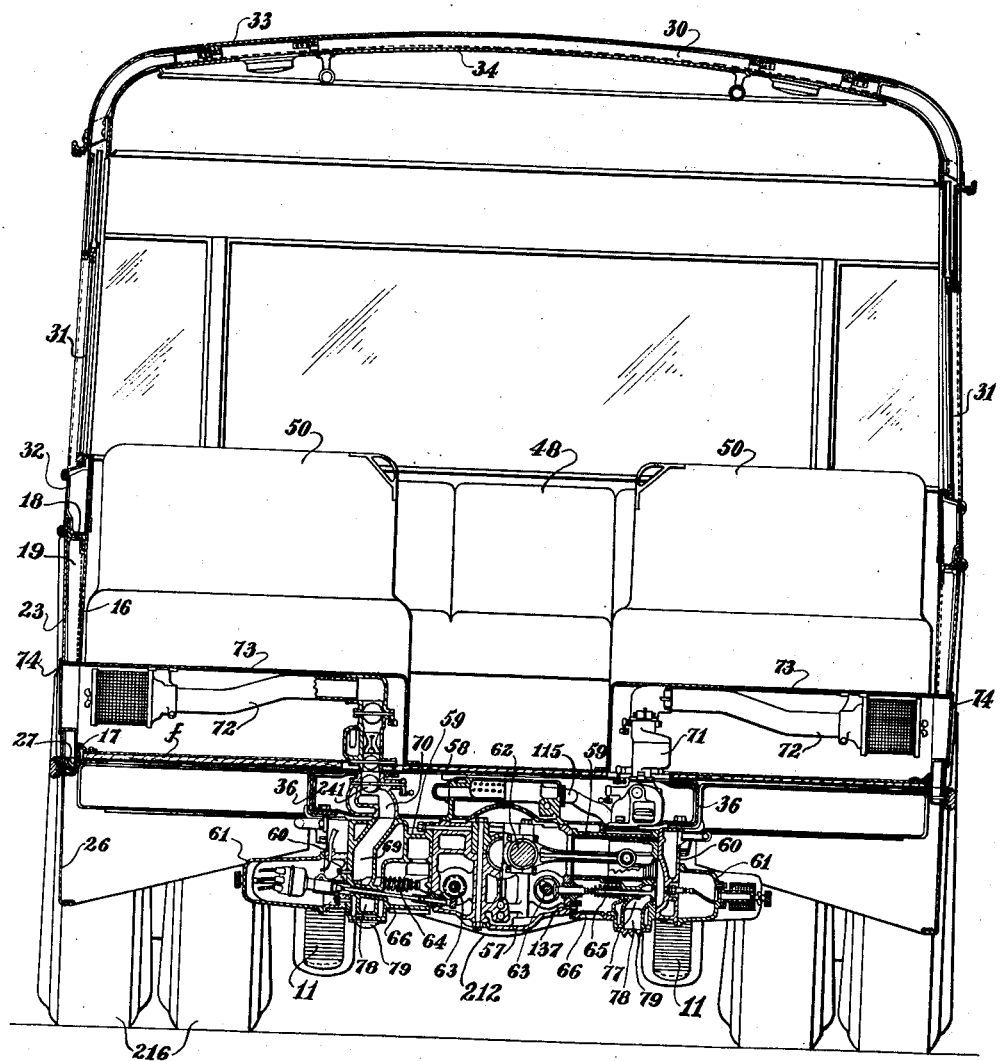

June 18, 1935.  H. D. CHURCH  2,005,312
MOTOR VEHICLE
Filed Aug. 22, 1932   15 Sheets-Sheet 9

INVENTOR
HAROLD D. CHURCH.
BY RM Cooper
ATTORNEY

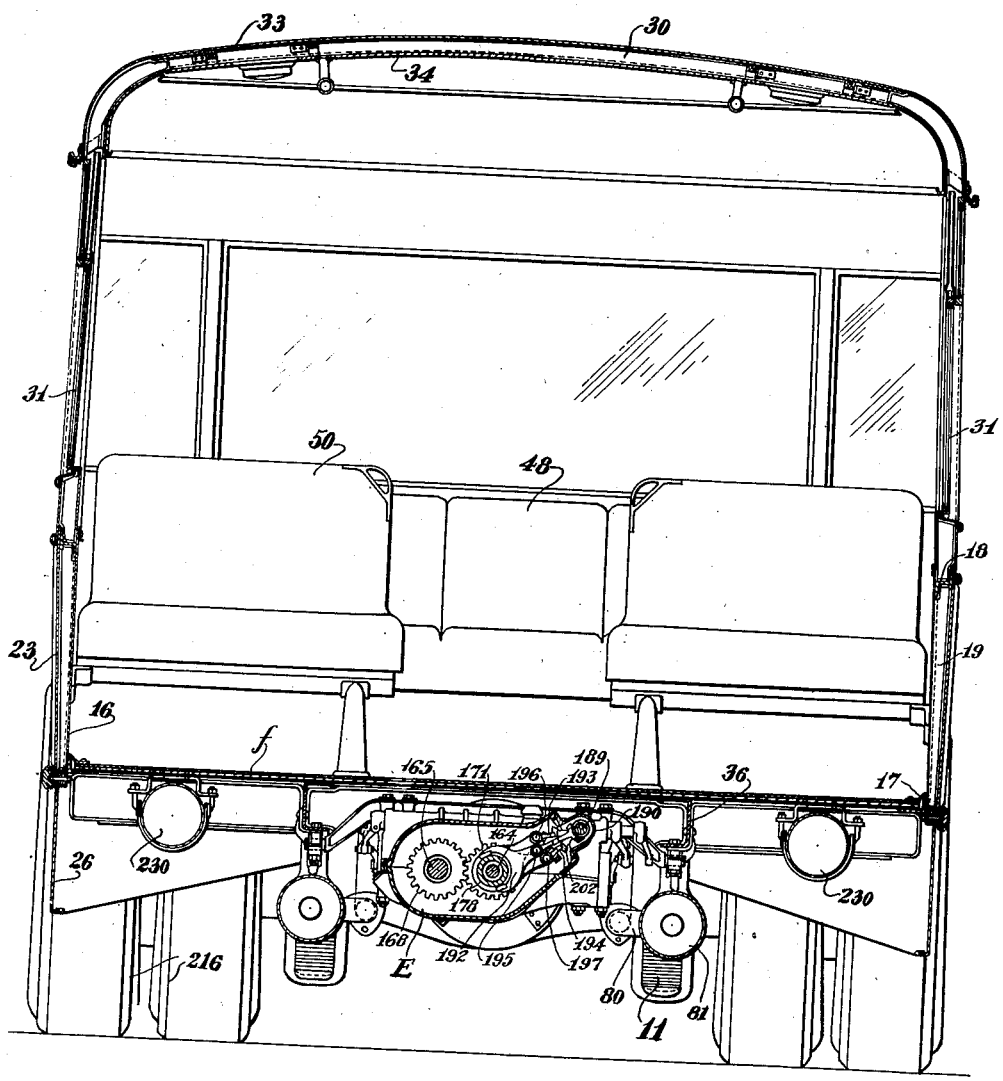

June 18, 1935.  H. D. CHURCH  2,005,312
MOTOR VEHICLE
Filed Aug. 22, 1932   15 Sheets-Sheet 11
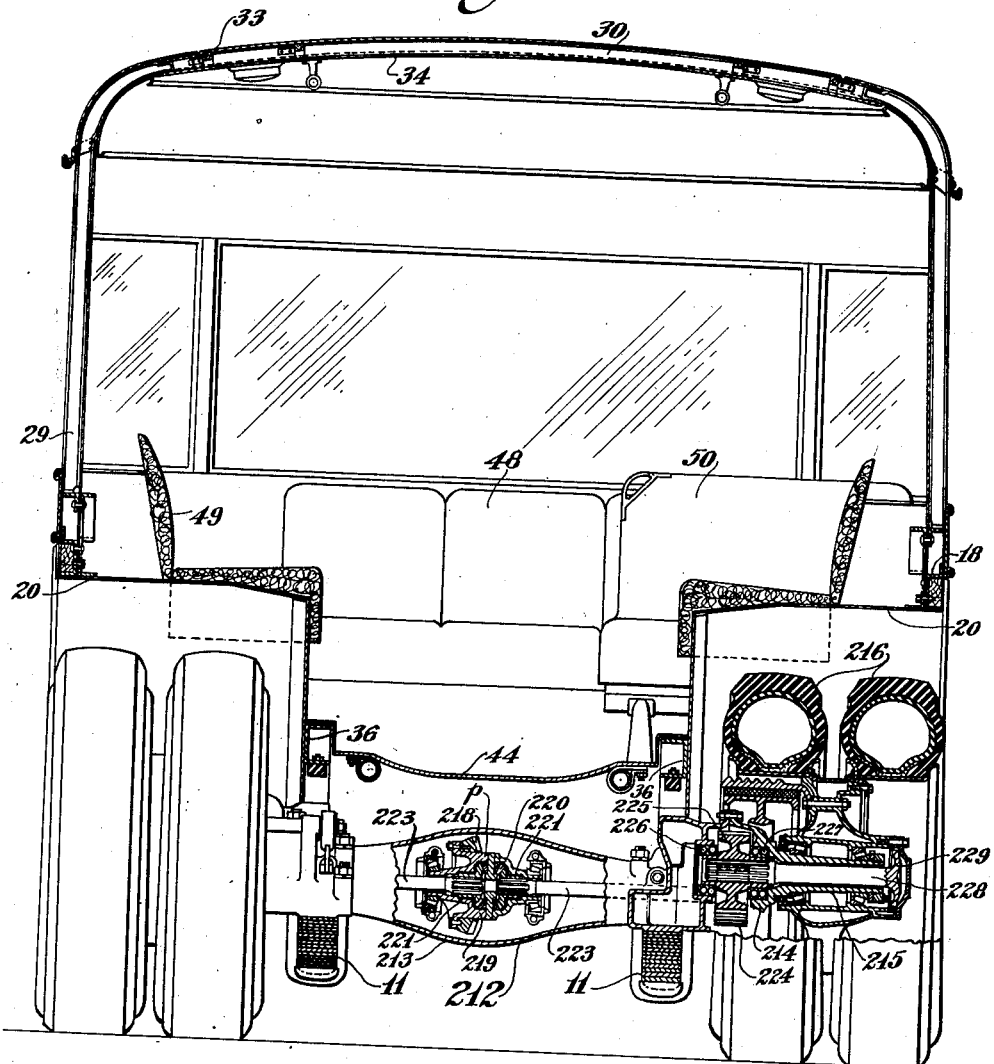
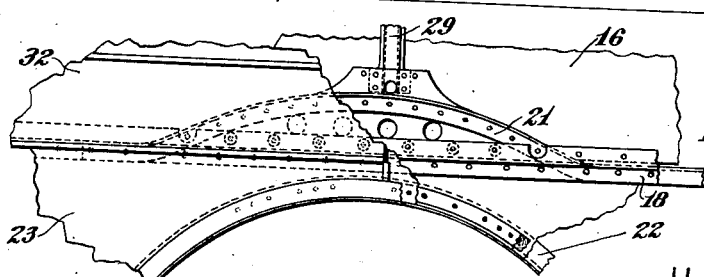
INVENTOR
HAROLD D. CHURCH.
BY RMCooper
ATTORNEY

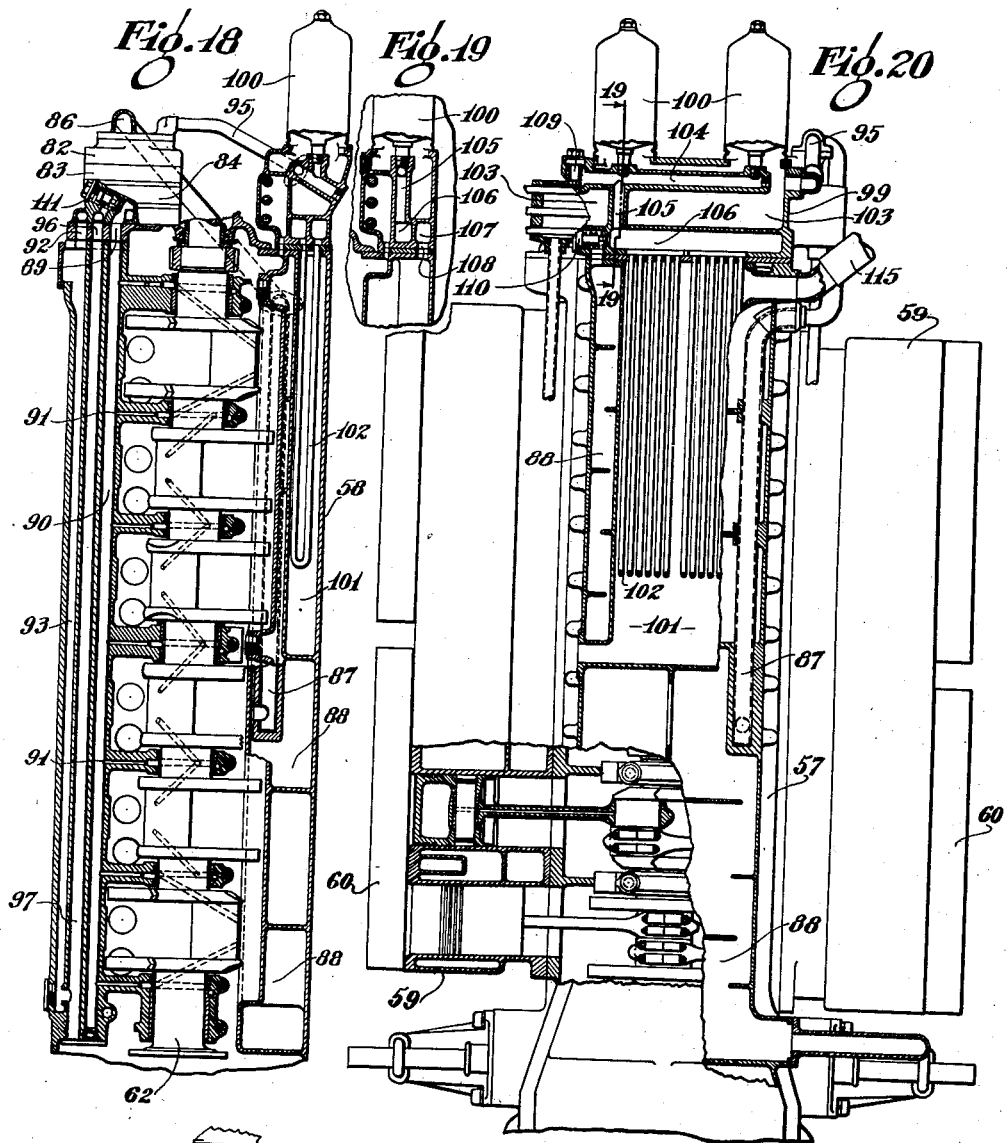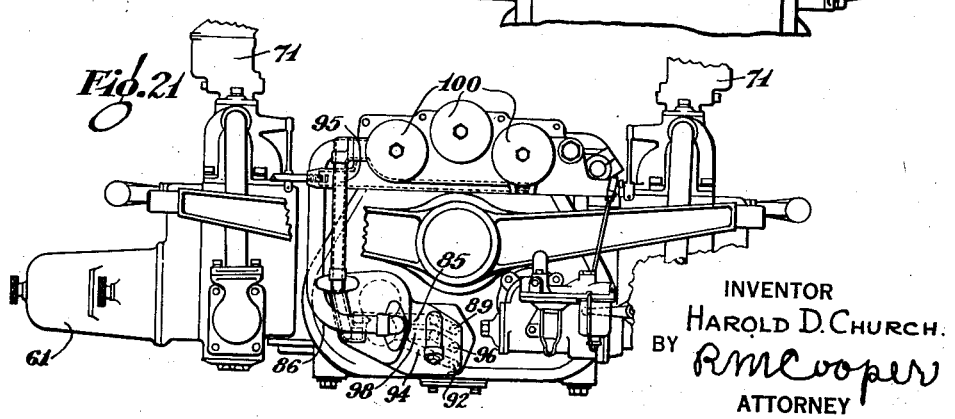

June 18, 1935.   H. D. CHURCH   2,005,312
MOTOR VEHICLE
Filed Aug. 22, 1932   15 Sheets-Sheet 13
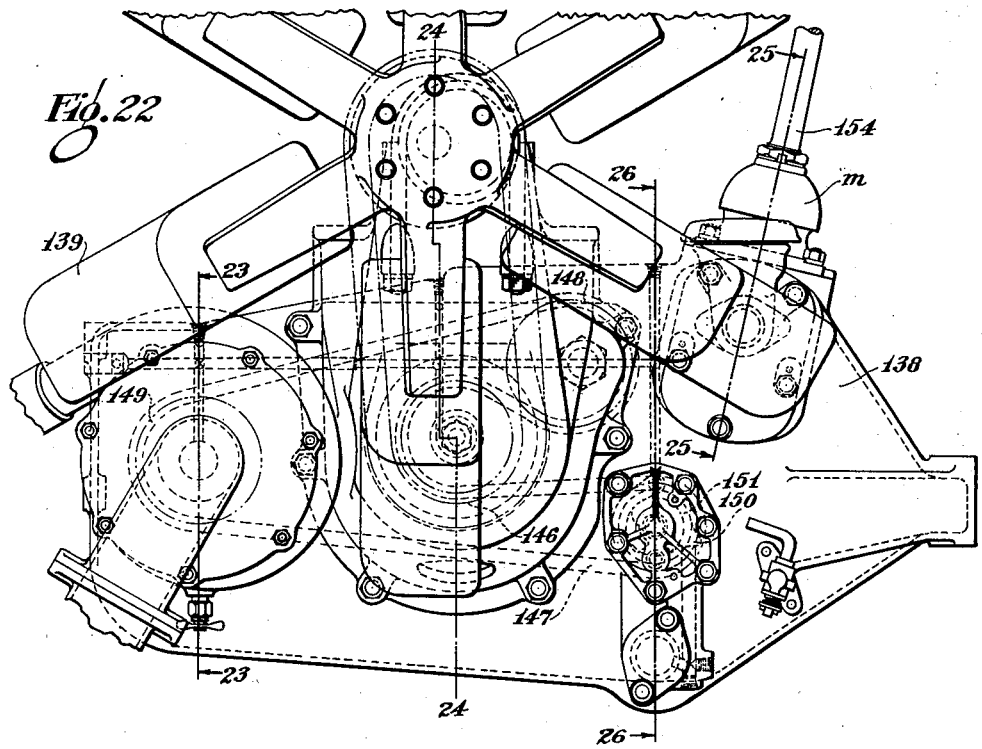
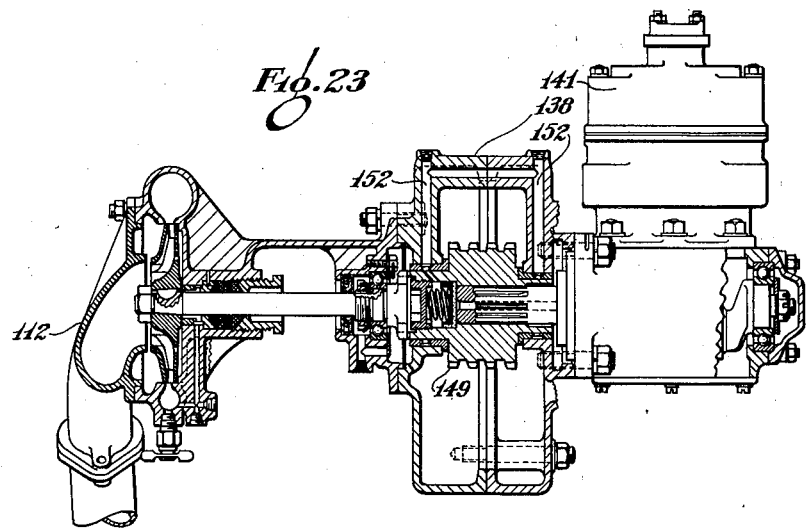
INVENTOR
HAROLD D. CHURCH.
BY RM Cooper
ATTORNEY June 18, 1935.  H. D. CHURCH  2,005,312
MOTOR VEHICLE
Filed Aug. 22, 1932  15 Sheets-Sheet 14
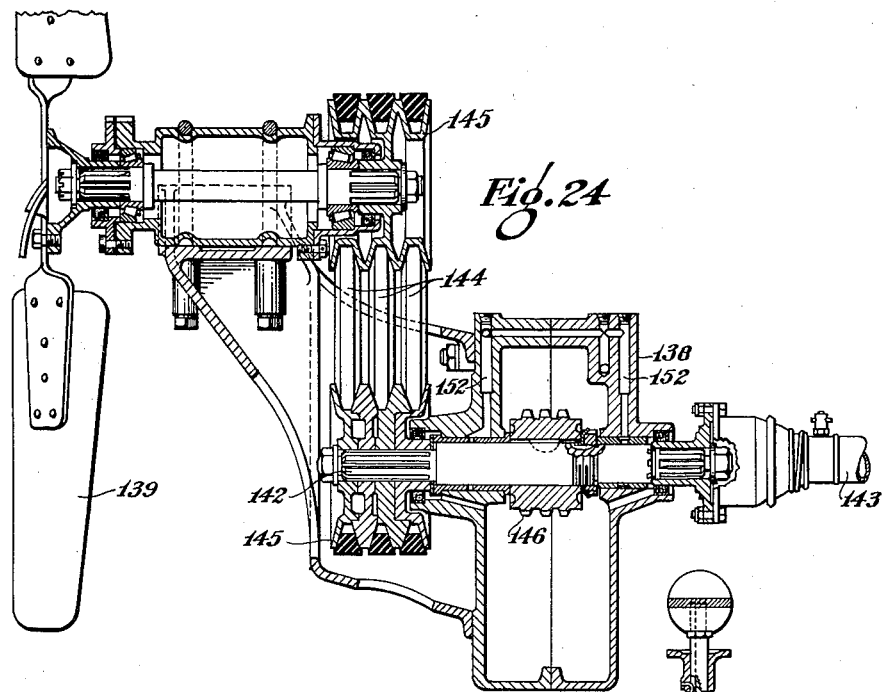
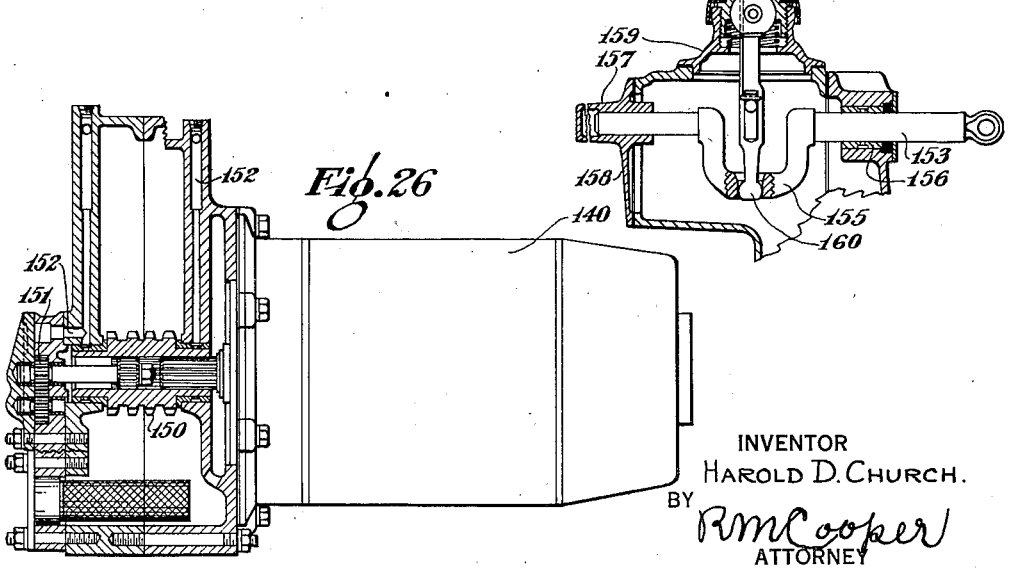
INVENTOR
HAROLD D. CHURCH.
BY R M Cooper
ATTORNEY June 18, 1935.  H. D. CHURCH  2,005,312
MOTOR VEHICLE
Filed Aug. 22, 1932   15 Sheets-Sheet 15

INVENTOR
HAROLD D. CHURCH.
BY R M Cooper
ATTORNEY

Patented June 18, 1935

2,005,312

UNITED STATES PATENT OFFICE 2,005,312

MOTOR VEHICLE

Harold D. Church, Cleveland, Ohio, assignor to The White Motor Company, Cleveland, Ohio, a corporation of Ohio Application August 22, 1932, Serial No. 629,774

20 Claims.   (Cl. 180—54)

My invention relates to motor vehicles, and is particularly concerned with certain improvements pertaining to the construction and assembled correlation of the body, chassis, power generating and transmission mechanisms. It is of special value in connection with automotive buses and other power driven vehicles where the load carrying capacity and the facility of loading and unloading are features of prime importance.

There has long been a demand in the art for an adequately powered bus having the greatest passenger carrying capacity consonant with passenger comfort and the facility for loading and discharging the vehicle and possessing a level uninterrupted floor relatively close to the ground. Efforts to satisfy this demand have been made in connection with buses of the street car type, that is, buses constructed with bodies resembling a conventional street railway car. This type of bus affords a greater floor area than the bus wherein the engine is located forward of the body, but to attain efficient utilization of such area for passenger carrying purposes without the use of complicated or otherwise undesirable features, involves a difficult problem of construction which has never been satisfactorily solved prior to my invention.

Among the various attempts to solve the aforesaid problem, there have been to the best of my knowledge but two types of construction developed in which highly efficient utilization of the floor space has been realized without either departing from the requisite of a low floor level, or resorting to the use of expensive or complicated electrical power transmission mechanism. One of these two types of construction embodies the use of dual power plants, a feature which adds to the cost of the construction, complicates controls, and increases the cost of repairs as compared with a structure embodying a single power plant. The other type of construction, although provided with a single power plant, is unbalanced in weight due to the disposition of the motor at one side of the vehicle.

My invention provides a solution to the aforesaid problem through the use of a balanced construction which embodies but a single power plant, and which possesses both the feature of a low floor level and the feature of highly efficient utilization of the floor area. In accordance with my invention, the power generating and power transmission mechanisms are located under the floor of the vehicle, and are so constructed and so coordinated with the other parts of the vehicle as to attain a road clearance within practical limits.

An important feature of my invention is to be found in the use of an engine of the horizontal type, whereby the engine is of small depth or vertical projection so as to obtain a practical road clearance and a low floor level.

A further important feature of my invention resides in constructing the engine with a lubricating system which does not require a deep reservoir at the bottom of the crankcase.

A further important feature of my invention resides in the use of a change speed gearing mechanism which is constructed with a small vertical projection.

A further important feature of my invention resides in the use of a driving axle which is constructed with a depressed or dropped portion to afford clearance for certain members of the under-frame of the vehicle.

A still further important feature of my invention resides in a body structure capable of resisting the stresses imposed thereon without employing longitudinally extending under-structure members of large depth. The advantage of such structure is that it affords a better organization and correlation of parts than could be obtained through the use of a conventional chassis frame of deep section, or of members corresponding to chassis frame side rails, as are usually employed in motor coach construction.

In addition to providing a solution to the foregoing problem, and to providing a bus of the character set forth in the preceding discussion, my invention has for its object the provision of a chassis, power generating, and power transmission construction, which can be employed in any vehicle requiring a load carrying floor or platform of large area.

In the drawings:

Figure 1 is a plan view of a bus embodying the invention, the upper portion of the body of the bus being removed so as to show the seating arrangement.

Figure 2 is a side elevation of the bus.

Figure 3 is a front end elevation of the bus.

Figure 4 is a rear end elevation of the bus.

Figure 5 is a fragmentary section through the front end of the body of the bus showing the raised platform beneath the driver's seat.

Figure 6 is a perspective view, partially in section, showing the construction employed in the side walls of the body of the bus.

Figure 7 is a plan view of the forward portion of the under-structure of the bus, and of the steering wheel assembly.

Figure 8 is a plan view of the rear portion of the under-structure of the bus.

Figure 9 is a phantom side elevation of the forward end of the bus with the side walls, seats and top of the bus shown in dot and dash lines, and with the near front wheel cut away.

Figure 10 is a side elevation of the rear end of the bus with the seats, side walls and top of the body shown in dot and dash lines, and with the near rear wheel and a portion of the axle removed.

Figure 11 is a transverse sectional view of the bus taken immediately in front of the front axle and looking towards the rear.

Figure 12 is a transverse sectional view of the bus looking towards the rear, and taken through the central portion of the engine, the section of the engine being composite, and consisting of a portion at one side taken through a cylinder of the engine and a portion at the other side taken intermediate two of the cylinders of the engine.

Figure 15 is a transverse sectional view of the bus taken through the forward end of the transmission and looking towards the rear of the bus.

Figure 16 is a transverse sectional view of the bus taken immediately in front of the rear axle and looking towards the rear of the bus, the axle being broken away and certain of the internal parts shown in section.

Figure 17 is a fragmentary side elevation of the body of the bus showing the construction employed in the side walls of the body above the wheel housings.

Figure 18 is a fragmentary vertical section of the engine taken through the longitudinal centerline of the engine.

Figure 19 is a fragmentary vertical section of the engine taken on a line corresponding with line 19—19 of Figure 20.

Figure 20 is a plan view of the engine, certain parts being broken away in order to show internal construction.

Figure 21 is a fragmentary front elevation of the engine.

Figure 22 is a fragmentary elevation of an assembly of units mounted at the forward end of the bus.

Figure 23 is a sectional view of the assembly shown in Figure 22, the plane of the section being indicated in Figure 22 by the line 23—23.

Figure 24 is a sectional view of the assembly shown in Figure 22, the section being taken on line 24—24 of Figure 22.

Figure 25 is a sectional view of the assembly shown in Figure 22, the plane of the section being taken on line 25—25 of Figure 22.

Figure 26 is a sectional view of the assembly shown in Figure 22, the plane of the section being indicated in Figure 22 by the line 26—26.

Figure 13:
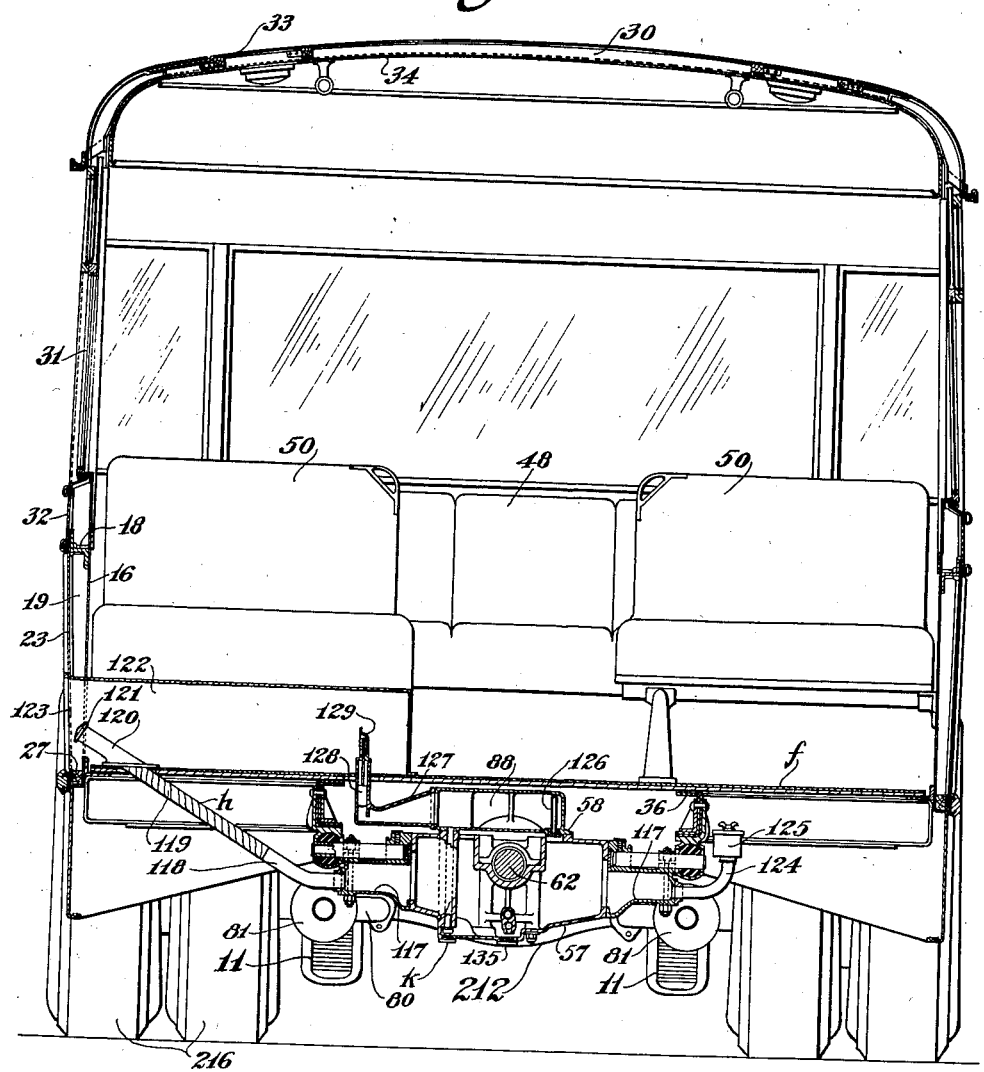
Figure 13 is a transverse sectional view of the bus taken through the rear support of the engine and looking towards the rear of the bus.

Referring to the drawings, the bus therein illustrated comprises generally a body A, front and rear axles B and C, an engine D, and a transmission or gear box E. (See Figures 2, 7 and 8.)

The body A is provided with a load supporting and stress resisting frame built as a unitary structure therein, and is mounted upon the axles B and C by means of front and rear springs 10 and 11, without the intervention of chassis frame. It will be understood that any equivalent type of wheel mounting and spring suspension may be employed, and that the terms "axles" and "springs" comprehend all such types. The design of the body is such that the principal load supporting members are embodied in the sides and end walls of the body. Structure of any form capable of resisting large bending moments may be employed in the principal load supporting members, the structure in the opposite side walls of the body constituting a pair of longitudinal girders. In the illustrated embodiment the principal load supporting members are embodied in the sides of a plate girder construction which forms the lower portions of the side and end walls of the body, the design being such that the thrust of the spring and the loads supported by the under-structure of the body are transferred to the sides of the plate girder construction by cross structures arranged beneath the floor in a manner to permit the engine and transmission to be mounted therebetween in a position close to the floor.

The reason for departing from the conventional practice either of employing an interposed chassis frame to provide the chief longitudinal supporting members, or of incorporating into the under-structure of the body longitudinal members corresponding to the side rails of the chassis frame in lieu thereof, will be readily understood. The depth to which it would be necessary to construct such members in order for such members to serve as the principal longitudinal load supporting members of a construction as described would prohibit the engine from being mounted closely adjacent the floor, and would as a result require the use of a higher floor level in order to provide adequate road clearance.

The super-structure of the body includes the previously mentioned plate girder construction. In describing this plate girder construction reference is made especially to Figures 1, 6 and 17. Such plate girder construction is composed entirely of metal parts except for certain wooden strips hereafter specifically described as such, and is divided (see Figure 1) into four sections b, c, d, and e, by two main door openings 12 and 13, an emergency door opening 14, and a radiator opening 15. The section b extends between the door openings 12 and 13, section c between the door openings 12 and 14, section d between the door opening 14 and the radiator opening 15, the section e between the radiator opening 15 and the door opening 13. Each section (see Figures 6 and 17) comprises a plate 16 extending throughout its length, an arrangement of stiffening and strengthening members secured to the plate, and an outer cover secured to certain of the stiffening and strengthening members. The arrangement of stiffening and strengthening members employed in each section includes one or more angle members 17 located at the lower edge of the plate and serving to connect the plate with the outer ends of the adjacent members of the under-structure, a Z-bar 18 secured to the upper outer edge of the plate and extending the entire length thereof, and a plurality of suitably arranged vertically extending Z-bars 19 mounted on the outer surface of the plate below the Z-bar 18.

The portions of the sections b and d, which include the wheel openings (see Figures 11, 16 and 17), are strengthened by extending the plates 16 above the Z-bars 18 and by employing a special arrangement of stiffening and strengthening members, and in addition are reinforced and strengthened by wheel housings 20 secured at their outer edges to the plate 16 and at their lower edges to the under-structure. Generally described, the arrangement of stiffening and strengthening members employed in such portions consists of the Z-bar 18 of the section, a pair of curved angle members 21 secured to the plate 16 above the Z-bar 18, and a pair of angle members 22 secured to the lower portion of the plate and serving as a connection between it and the associated wheel housing.

The covers for the sections b, c, d and e are constructed of light sheet metal plates 23 which are secured to the Z-bars 18 and 19 by means of bolts 24 and screws 25, and otherwise secured in place in such a manner as to be readily removable in case of injury. At the ends of the body the plates 23 are extended below the super-structure to form skirt portions, but at the sides of the body are terminated slightly below the surface of the under-structure, and skirts provided in the form of depending plates 26 secured in place by means of wooden filler strips 27 and bolts 28.

The upper portion of the body (see Figures 1, 6, 11, 12, etc.) comprises a metal frame work embodying posts 29 secured to the upper portion of the plate girder construction, cross roof members 30 connecting the posts at opposite sides of the vehicle, and longitudinal roof members (not shown) connecting the posts at the ends of the vehicle with the contiguous cross members 30. Intermediate the posts 30 are the windows 31 of the vehicle, and adjacent the lower ends of the posts there is a structural frame work 32 forming the sills of the windows. A roof formed of metal sheets 33 is secured to the members 30, and secured to the inner surface of such roof members and to the upper ends of the posts 29 there is an inner metal cover 34.

The under-structure of the body A (see Figures 7 and 8) consists of a fabrication of metal parts which serve to support the floor, transmit the loads and stresses from the axle to the plate girder construction, and carry the engine and driving mechanisms. It comprises as its chief stress resisting members the aforesaid cross structures indicated in the drawings by the numeral 35. Connecting the cross structures 35 are two longitudinal members 36 spaced inward from the sides of the vehicle. These members provide a support for the engine and transmission and, as shown, are formed with sufficiently small depth to permit the engine and transmission to be mounted closely adjacent the floor. The members 36 can be constructed with a small depth since they are supported at either side of the engine and transmission by the cross structures 35, and in consequence are not subjected to large bending moments. The forward end of the under-structure consists of three longitudinal members 37, 38 and 39 connecting the forward cross structure 35 with the forward end of the plate girder construction, and of a brace member 40 connecting the members 37 and 38. The rear end of the under-structure comprises a pair of longitudinal members 41 and 42 connecting the rear cross structure 35 with the rear end of the plate girder construction.

The floor f of the body (see Figures 5, 12, 16, etc.) is supported from the under-structure, and is substantially level, except for a small portion (see Figure 5) beneath the driver's seat which is slightly raised to afford the driver an unobstructed view to the rear. The major portion of the floor is constructed of wood clad with metal sheets 43 secured directly to the members 36 and the cross structures 35. The portion of the floor above the rear axle is constructed entirely from a metal plate 44 suspended from the members 36, and the portion beneath the driver's seat is formed of a sheet 45 similar to the sheets 43 mounted above the under-structure by means of wooden filler blocks 46.

The seating arrangement within the body (see Figure 1) is designed to effectively utilize the space available for such purpose. The arrangement comprises a driver's seat 47 located at the forward end of the body, a longitudinal transverse seat 48 at the rear of the body, longitudinal seats 49 mounted over the front and rear wheel housings, and a plurality of transverse seats 50 of the two-passenger type arranged along the side of the body in such a manner as to form with the seats 49 a central aisle 51.

The front and rear springs 10 and 11, (see Figures 9 and 10) are located beneath the front and rear ends of the members 36 of the under-structure, the arrangement being such that the forward springs 10 are connected to the under-structure directly beneath the two forward cross structures 35, and the rear springs directly beneath the two rear cross-structures 35. The forward ends of the springs 10 and 11 are secured in place by means of brackets 52 and shackle members 53, and the rear ends of the springs by means of brackets 54, shackle members 55, and shackle links 56.

The engine D (see Figures 7, 9 and 13) is mounted upon the longitudinal members 36 in a position adjacent the front wheels and centrally with respect to the sides of the bus. Such engine is constructed with horizontally disposed cylinders and in such a manner as to have a relatively small depth or vertical projection as compared with an engine constructed with vertical cylinders. To further minimize its depth the engine is provided with a lubricating system of the dry-sump type employing a shallow oil receiving reservoir maintained substantially empty of oil during operation of the engine. For the purpose of definition, it may be termed a horizontal dry-sump engine.

Generally described (see Figures 7 and 12) the engine comprises a crank case 57, a crank case cover 58, a pair of horizontally disposed cylinder blocks 59, cylinder heads 60, cylinder head covers 61, a crank shaft 62, a pair of cam shafts 63, and inlet and exhaust valves 64 and 65. The organization of the engine is such that the valves 64 and 65 are located in the under sides of the cylinder blocks in a position to be readily accessible thru removal of cover plates 66. Included within the engine assembly is a conventional type clutch mounted in a casing 67 at the rear of the engine, and mounted upon the casing 67 are two electrical motors 68 for starting the engine.

The cylinder blocks are provided with separate fuel induction systems of down-draft type designed to effect an even, efficient distribution of the fuel to the cylinders. To this end, they are constructed with passages involving a minimum number of rectilinear turns and offering small resistance to flow, and to the same end in a manner to preclude pockets wherein liquid fuel condensing out of the fuel mixture can collect and later be drawn into the engine in liquid form. The system for each cylinder block comprises canals 69 formed in the block, a manifold 70 mounted on the upper side of thte block, a carburetor 71 mounted on the upper surface of the manifold 70, and a breather pipe 72 extending laterally from the carburetor. The carburetors extend above the floor of the bus and are located in rectangular housings 73 disposed beneath two of the seats 50 at opposite sides of the aisle. The housings 73 also enclose the conduits 72 which extend to the sides of the bus contiguous screened openings 74. Fuel is supplied to the carburetors from a storage tank 75 (see Figure 8) located beneath the floor at the rear of the vehicle and supported from the members 41 and 42 of the under-structure by means of straps 76.

The cylinder blocks are also provided with separate exhaust systems, the system for each block comprising conduits 77 leading from the combustion chambers to the lower portion of the block, an exhaust manifold 78 formed by casting a canal in the block and enclosing the cavity by a cover plate 79, and an exhaust conduit 80 leading to the rear of the bus and intercepted intermediate its ends by a muffler 81. By constructing the exhaust systems in the manner described a conservation of space between the upper and lower planes of the engine is realized, which contributes to the attainment of a low floor level.

It will be noted with respect to the exhaust systems that the canals in the cylinder blocks are cooled on three sides by the cooling water of the engine. Consequently, a large portion of the heat from the exhaust gases is carried through the engine cooling water to the water cooling radiator g (see Figures 7 and 9) located at the forward end of the vehicle, and there dissipated. An advantage of this arrangement is that less heat is transferred from the exhaust system to the interior of the bus. A further advantage is that the exterior parts of the exhaust system are maintained at a relatively low temperature such as to preclude injury from sudden cooling, as for instance, when water is thrown up from the surface of the road.

The lubricating system for the engine D (see Figures 18, 19, 20 and 21) comprises a set of three gear pumps 82, 83 and 84, located at the forward end of the cam shaft at the right hand side of the engine and operatively connected thereto. The pump 82 communicates at its intake side through a duct 85 and pipes 86 and 87 with a supply reservoir 88 formed in the crank case cover 58, and at its discharge side is connected through a duct 89 with a manifold 90 which communicates with ducts 91 leading to the various bearings of the engine. The pump 83 communicates at its intake side through a duct 92 with the forward end of an oil receiving reservoir 93 formed in the bottom of the crank case, and at its discharge side is connected through a duct 94 with a pipe 95. The pump 84 communicates at its intake side through a duct 96 and a pipe 97, with the rear end of the oil receiving reservoir 93, and at its discharge side through a duct 98 with the aforementioned pipe 95.

The pipe 95 leads upward to an oil cleaning and cooling system, which system comprises a block 99 located at the forward end of the crank case cover 58, filters 100 communicating with chambers and conduits formed in the block 99, a water chamber 101 formed in the cylinder head cover 58, and cooling pipes 102 extending from the block into the cooling chamber 101 and connecting upper and lower chambers in the block. The pipe 95 communicates at its upper end with a chamber 103 in the block 99, which chamber communicates with the outer compartments of the filters 100. The inner compartments of the filters, which are separated from the outer compartments by conventional filtering elements, communicate with a conduit 104 in the block 99, which communicates through a duct 105 and a chamber 106 with the lower end of the cooling tubes 102. The upper ends of the cooling tubes 102 open into a chamber 107 located above the chamber 106, which chamber communicates through an opening 108 with the interior of the supply reservoir 88.

Mounted within the block 99 at the end of the conduit 104 is a spring pressed valve 109, which controls a passage between the conduit 104 and the chamber 103, and is designed to permit the oil to pass directly from the chamber 103 to the conduit 104 should the filtering elements of the filters become clogged. Mounted at the end of the chamber 106 is a second spring pressed valve 110 which controls a passage between the chamber 106 and the interior of the supply reservoir 88. This valve is adapted to open and allow the oil from the chamber 106 to flow directly into the reservoir 88 in case the cooling tubes become obstructed.

In addition to the valves 109 and 110, the lubricating system includes a spring pressed valve 111 controlling a passage between the duct 89 leading into the manifold 90 and the duct 96 leading into the pump 84. This valve is designed to allow oil from the duct 89 to flow into the duct 96 leading to the pump 84, should the pressure created in the duct 89 and the manifold 90 become excessive.

During operation of the engine the pump 82 draws oil from the supply reservoir 88 through the duct 85 and the pipes 86 and 87 delivering it through the duct 89, manifold 90, and ducts 91 to the bearings of the engine. The oil discharged through the bearings of the engine collects in the bottom of the crank case from whence it is drawn into the pumps 83 and 84 through the pipe 97, duct 96, and duct 92, and delivered through ducts 94 and 98, and pipe 95 to the chamber 103 in the block 99. From the chamber 103 the oil passes into the outer chambers of the filters 100 and from the outer chambers through the filter elements into the inner chambers. From the filters the oil is delivered into the conduit 104, and from the conduit 104 to the conduit 105, and thence into the chamber 106. From the chamber 106 it passes through cooling tubes 102 into the upper chamber 107, and then through the opening 108 into the supply reservoir 88. The cooling water for the chamber 101 is delivered thereto from the radiator g by means of a pump 112 (see Figures 7 and 9), hereafter described connected with the radiator by a conduit 113 and with the chamber 101 by a pipe 114. From the chamber 101 the cooling water passes through pipes 115 into passages formed in the engine to cool the same, and from the cooling water passages in the engine through conduits 116 back to the radiator.

The relative capacities of the pumps 83 and 84 are such that either one of the pumps acting alone is capable of drawing a greater volume of oil from the reservoir 93 than is delivered thereto by the pump 82. As a result, the reservoir 93 is maintained substantially dry of oil notwithstanding inclination of the engine resulting in drainage of the oil to one end of the reservoir.

Extending from opposite sides of the crank case 57 (see Figure 13) are two tubular members 117 which support the rear portion of the engine. These members communicate with the crank case, and the member upon the right hand side of the bus is provided with a conduit $h$ through which oil is supplied to the engine, which conduit consists of a pipe 118, a flexible hose 119, and a filler neck 120 provided with a removable cap 121. The filler neck 120 is mounted above the floor in the outer end of a rectangular housing 122 located beneath one of the seats 50 at the right hand side of the bus, and is rendered accessible for supplying oil to the engine by means of a door 123 mounted in the side of the bus. Extending upwardly from the tubular member 117 at the opposite side of the bus, there is a breather pipe 124 terminating in an air filter 125.

Mounted in the lower wall of the reservoir 88 there is a breather tube 126 communicating at its upper end with the reservoir 88 and at its lower end with the interior of the crank case. The purpose of the tube 126 is to provide a passage through which air drawn from the crank case and delivered to the reservoir 88 can escape back into the crank case. By virtue of this expedient, a saving in lubricant is realized as a result of the oil-laden air not being permitted to escape to atmosphere.

Protruding from the side of the crank case cover 58 and communicating with the reservoir 88 there is a cored member 127 which extends upwardly through the floor into the housing 122. Mounted within the vertical arm of the member 127 there is a float 128 provided with a scale 129, which scale is visible from the sides of the bus when the door 123 closing the end of the housing 122 is open, and which is provided to indicate the level of the oil in the reservoir 88.

Figure 14:
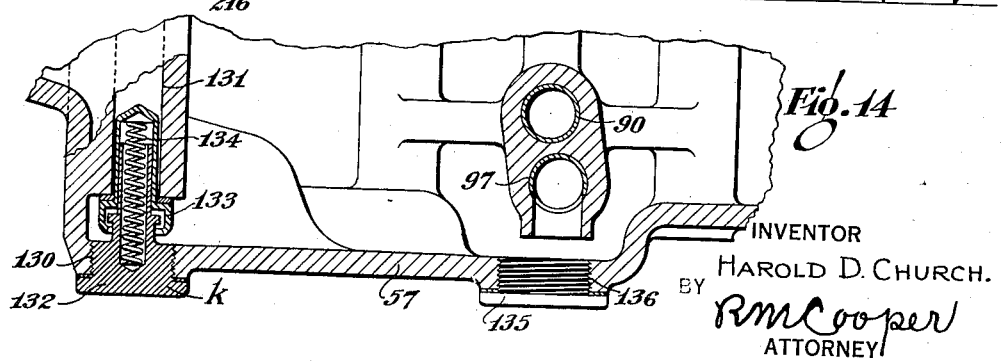
Figure 14 is an enlargement of a portion of the section of the engine shown in Figure 13.

Means for completely draining the engine of oil (see Figure 14) is provided in the form of a cap $k$ screwed into an aperture 130 in the bottom of the crank case, and serving both to close the aperture 130 and the lower end of a super-adjacent duct 131 communicating with the supply reservoir 88. The cap $k$ comprises a threaded member 132 screwed into the opening 130 in the bottom of the crank case, a plunger 133 mounted on an extension of the member 132 and urged upward by a spring 134 to close the lower end of the duct 131. A secondary means for draining the reservoir 93 is provided through a plug 135 screwed into an opening 136 formed in the bottom of the crank case.

Returning at this point in the description to the reservoir 93, this reservoir (see Figure 12) communicates through ducts 137 with the portions of the cylinder blocks which enclose the inner ends of the valves, and forms in conjunction therewith a joint reservoir, which when the engine and bus are in a level position can hold all of the oil employed in the engine without flooding the combustion chambers or cylinders, the oil attaining a level slightly below the valves. One object of providing the joint reservoir with a capacity as described is to permit the engine to be filled with oil, when not running, without danger of flooding the combustion chambers and cylinders. A further object is to avoid flooding the combustion chambers and cylinders with oil in consequence of the engine having stood idle for a sufficient time for the oil in the upper portion of the system to have drained into the reservoirs 93 through the pumps 82, 83 and 84. During running of the engine, flooding of the combustion chambers and cylinders is prevented by the action of the pumps 83 and 84 which maintain the reservoir 93 substantially empty of oil.

The manner in which the dry sump lubricating system just described contributes to the attainment of an engine of small depth is best explained by comparing the engine illustrated with a modified form of such engine equipped with a wet sump lubricating system, i. e., with a lubricating system of the conventional type in which the drainage reservoir and supply reservoir are combined in one reservoir located in the bottom of the crankcase. In the construction of a modified form of engine equipped with a wet sump lubricating system, it would be necessary to provide a substantial space between the oil level in the sump (the combined drainage and supply reservoir) and the cylinders and valves to prevent flooding of the cylinders and combustion chambers through inclination of the vehicle. The space thus provided would increase the depth of the engine over that of the engine illustrated in which the oil level in the sump when containing all of the oil in the lubricating system is spaced a comparatively small distance below the cylinders and valves.

At the forward end of the vehicle there is an assembly F (see Figures 22 to 26) which comprises the instrumentalities generally associated with an automotive engine, and a portion of the shifting mechanism for the transmission. This assembly comprises a casing 138, a fan 139 for cooling the radiator $g$, the previously mentioned water pump 112 for producing a circulation of the engine cooling water, an electrical generator 140 for producing electrical energy for lighting the bus and starting the engine, an air compressor 141 for supplying compressed air for use in operating the brakes of the vehicle, and a shifting mechanism $m$. The fan 139 and the pump 112 are mounted upon the forward side of the casing 138 while the generator 140 and the air compressor 141 are located on the rear side of the casing. The shifting mechanism $m$ is mounted intermediate the ends of the casing upon the left hand side thereof. In the central portion of the casing, there is a shaft 142 driven from the engine crank shaft by means of a shaft 143. The shaft 142 extends through the forward side of the casing and drives the fan 139 by means of belts 144 and pulleys 145. Mounted upon the shaft 142 is a gear 146 which drives the air compressor 141, the water pump 112, and the generator 140, through a chain 147 and gears 148, 149 and 150 journalled in the casing 138 and connected to the driving shafts of the mechanisms recited. Mounted in the forward wall of the casing 138 opposite the generator 140 is a pump 151 driven by the gear 150 which drives the generator. This pump draws oil from the bottom of the casing 138 which is designed to serve as an oil reservoir, and delivers the oil through an arrangement of ducts 152 to the various bearings of the driving mechanism from whence the oil flows back into the reservoir in the bottom of the casing 138.

The shifting mechanism m comprises a shaft 153 and a shifting lever 154. The shaft 153 is formed with a crank portion 155 and is slidably and rotatably mounted in a rear bearing 156 supported in the rear wall of the casing, and a front bearing 157 formed in a plate 158 secured to the forward side of the casing. The shifting lever 154 is mounted for universal movement in a cover plate 159 secured to the top of the casing, and is formed at its lower end with a ball 160 which is engaged within a slot in the lower portion of the crank of the shaft 153. Through this arrangement the lever 154 when moved longitudinally with respect to the vehicle causes the shaft 153 to be shifted in a reverse direction, and when the lever 154 is moved transversely with respect to the vehicle the shaft 153 is rotated in a corresponding direction.

The fan 139 extends through an opening formed in the forward end of the floor of the bus (see Figures 5 and 9), and is housed within a casing 161 which extends rearwardly from the sides and top of the radiator and communicates with the opening in the floor. The fan is constructed with large blades and produces a large flow of air through the radiator with the result that the temperature of the air is not raised a sufficient amount to appreciably heat the floor of the bus when conducted thereunder by the casing 161.

The transmission E is constructed with a small depth or vertical extension and is mounted (see Figure 8) upon the longitudinal members 36 of the under-structure of the body in coaxial alignment with the engine D which is located centrally with respect to the sides of the body. Such transmission is constructed with large heavy gears in order to transmit the large amount of power delivered thereto by the engine D, and in order to reduce its vertical extension or depth is constructed with a shifting mechanism located at one side thereof and with the main shafts arranged in a substantially horizontal plane. In vehicles employing an engine having less power it will of course not be necessary to construct the transmission with the shifting mechanism and main shaft arranged as described, and it is to be understood that by a transmission constructed with a small vertical extension or depth is meant that the transmission does not have a sufficient depth to decrease the road clearance beyond a practical distance.

Figure 27:
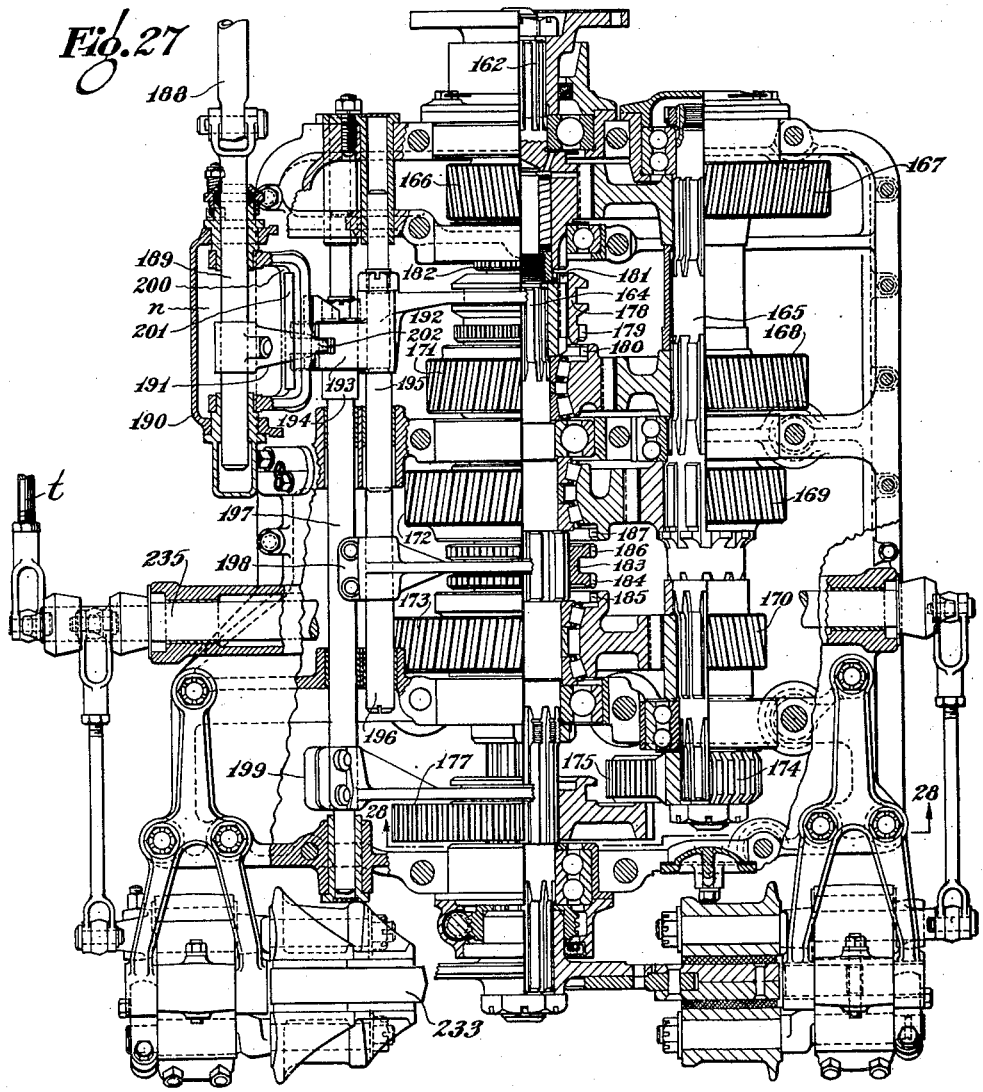
Figure 27 is a plan view of the transmission, certain parts being broken away and others being shown in section in order to disclose the internal construction.
Figure 28:
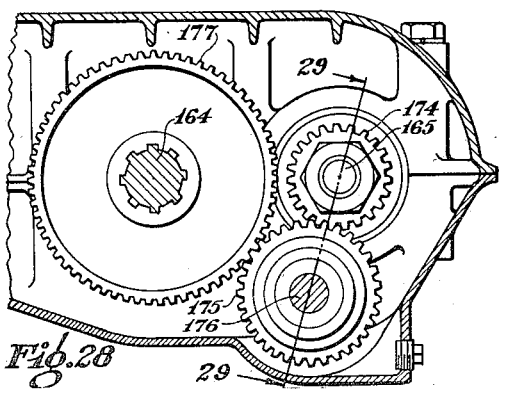
Figure 28 is a sectional view of the transmission taken on the line 28—28 of Figure 27.
Figure 29:
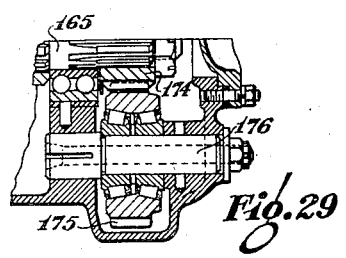
Figure 29 is a reduced sectional view of the transmission taken on line 29—29 of Figure 28.

Generally described, the transmission E comprises (see Figures 27 and 7) a driving shaft 162 connected to the driven shaft of the engine clutch by a shaft 163, a driven shaft 164 in axial alignment with the driving shaft 162, and a counter shaft 165 located at one side of the driven shaft. Formed on the rear end of the shaft 162 there is a driving gear 166 which meshes with a driven gear 167 rigidly secured upon the forward end of the counter shaft 165. Rigidly mounted upon the central portion of the counter shaft 165 are three gears 168, 169 and 170 which mesh with gears 171, 172, and 173 rotatably mounted upon the driven shaft 164. Mounted upon the rear end of the countershaft 165 there is a gear 174 (see Figures 28 and 29) which meshes with a reverse idler gear 175 journalled on a spindle 176 mounted in the bottom of the transmission case, and splined upon the driven shaft 164 is a gear 177 mounted in such a manner as to be movable into and out of engagement with the reverse idler gear 175.

Splined upon the forward end of the driven shaft 164, there is a slidable clutch member 178 provided with teeth 179 adapted for engagement with teeth 180 formed on gear 171, and with teeth 181 adapted for engagement with teeth 182 formed on gear 166. Similarly mounted upon the central portion of the shaft intermediate the gears 172 and 173, there is a second clutch member 183 which is provided with teeth 184 adapted for engagement with teeth 185 formed on gear 173, and with teeth 186 adapted for engagement with teeth 187 formed on gear 172.

Assuming that in each instance the clutch members 178 and 183 and the gear 177 initially occupy the positions shown, four forward speeds and a single reverse speed are obtained as follows:

First speed, by shifting the clutch member 183 in a rearward direction to bring its teeth 184 into engagement with teeth 185 on the gear 173, the resulting drive being through gears 166, 167, 170 and 173.

Second speed, by shifting the clutch member 183 in a forwardly direction to bring its teeth 186 into engagement with the teeth 187 on the gear 172, the resulting drive being through gears 166, 167, 169 and 172.

Third speed, by shifting the clutch member 178 in a rearward direction to bring its teeth 179 into engagement with the teeth 180 on the gear 171, the resulting drive being through gears 166, 167, 168 and 171.

Fourth speed or direct drive, by shifting the clutch 178 in a forward direction to bring its teeth 181 into engagement with the teeth 182 on the gear 166, and Reverse, by shifting the gear 177 to a position in which its teeth mesh with the teeth of the idler gear 175, the resulting drive being through gears 166, 167, 174, 175 and 177.

The mechanism for shifting the clutches 178 and 183 and the gear 177 comprises (see Figures 27 and 15) the previously described mechanism m, a mechanism n mounted within the transmission casing, and a shaft 188 connecting the shaft 153 with the shaft 189 of the mechanism n. The shaft 189 is mounted for longitudinal movement and rotatable oscillation within an extension 190 formed in the side of the transmission casing. Secured upon the shaft 189 is a finger 191 the free end of which is formed for engagement between the bifurcated upper ends of a fork 192 and members 193 and 194 mounted respectively on shifter rods 195, 196 and 197 supported in the webs of the transmission housing. The shifter rod 195 is connected to the clutch 178 by means of the fork 192, and the shifter rods 196 and 197 to the clutch 183 and the gear 177 by means of forks 198 and 199. Rotatably mounted within the extension 190 of the transmission casing in concentric relation to the shaft 189 there is a cradle 200 formed with a slot 201 which receives the finger 191 and with two depending lugs 202 located at opposite sides of the finger 191 and designed for engagement between the bifurcated ends of the members 193 and 194 and the fork 192. This cradle turns with the finger 191 and through the instrumentality of the lugs 202 acts to lock the shifter rods in neutral position except when operatively connected to the finger 191.

In effecting a speed change, the shafts 153, 188 and 189 are rotated through transverse movement of the lever 154 moving the finger 191 out of engagement with the upper bifurcated end of one of the members 192, 193 or 194 into engagement with the end of another of such members. The lever 154 is then moved forwardly or rearwardly to effect the speed change desired with a resultant longitudinal movement of the rods 153, 188 and 189, and finger 191, producing a longitudinal movement of the shifter rod connected to the finger and shifting the associated part of the transmission. In accomplishing such operation, the cradle 200 is turned by the finger 191 to a position where one or the other of the lugs 202 or both of the lugs, depending upon the driving connection initiated, acts to lock in neutral positions the shifter rods retaining such positions.

The front axle B is constructed in a more or less conventional manner, and comprises (see Figures 11, 7 and 9) a downwardly bowed member 203 and steering knuckles 204 journalled on the ends of the member 203. The steering knuckles are formed with spindles 205 upon which are journalled the front wheels 206, and with arms 207 connected by a tie rod 208. The left hand steering knuckle 204 is further formed with a steering arm 209 connected through a drag link 210 with a steering wheel assembly 211 mounted at the forward end of the bus. The steering mechanism is adapted for the application of power drive should it be desired to employ the same, and it is to be understood that such application is contemplated as coming within the purview of the present invention.

The rear axle C (see Figures 10 and 16) comprises a casing 212 consisting of a central section 213, and two end sections 214 bolted to the ends of the central section, the end sections being formed with tubular spindles 215 upon which are journalled the rear wheels 216. The ends of the central section and the adjoining portions of the end sections are enlarged and cupped in a manner to form fluid tight compartments 217, and such enlargements are so formed with respect to the other parts of the sections that the axis of the central tubular portion of the central section 213 lies below the axis of the spindles 215 formed on the sections 214. Mounted in the central portion of the section 213, which is enlarged for its reception, is a differential mechanism p comprising a ring gear 218, a housing 219, differential gears 220, and driven gears 221, the former being operatively connected to the driven shaft 164 of the transmission by means of a shaft 222 equipped with a driving pinion not shown. The driven gears 221 of the differential are connected through longitudinally extending shafts 223 with gears 224 mounted in the lower portions of the compartments 217 by means of anti-friction bearings (not shown) respectively supported by the sections 213 and 214. The gears 224 mesh with gears 225 mounted in bearings 226 and 227 respectively supported in the sections 213 and 214. The gears 225 receive the inner splined ends of stub axle shafts 228 which extend through the hollow spindles 215 and are formed with enlarged ends 229 non-rotatably secured to the hubs of the rear wheels.

By constructing the axles B and C with dropped portions as described, a sufficient amount of clearance between the axles and the under-structure of the body is provided to take care of spring flexure, notwithstanding that the body is mounted in a position with the floor close to the ground.

The bus is provided with brakes at the wheels operated by a compressed air system of a conventional type. The compressed air system (see Figures 7 and 8) comprises a pair of storage tanks 230 located beneath the floor at opposite sides of the transmission and receiving air from the compressor 141, and a control valve 231 located at the forward end of the bus beneath the driver's seat. The control valve 231 is operated through a mechanism s by a pedal 232 located at the right hand side of the steering gear. The bus is also provided with a propeller shaft brake 233 of the disc type (see Figures 8 and 27) located at the rear of the transmission, which brake is connected (see Figure 7) by a linkage consisting of pull rods 234 and rock shafts 235 with a hand lever 236 mounted at the left hand side of the steering gear.

The driving clutch associated with the engine D is operated by a pedal 237 (see Figure 7) located between the brake lever 236 and the steering gear, the connection between such pedal and the operating mechanism of the clutch consisting of a pull rod 238 and a rock shaft 239 and a Bowden wire 240. The throttle valves 241 of the carburetors 71 are controlled (see Figures 12 and 7) through a suitable arrangement of mechanism including an accelerator pedal 242 mounted adjacent the brake pedal 232, and a linkage t connecting the pedal 242 with the operating arms of the throttle valve 241.

In operation of the bus, power is transmitted through the clutch and transmission to the shaft 222 which drives the differential p. From the differential p power is transmitted by way of the shafts 223, gears 224 and 225 to the sub-axles 228 which drive the rear wheels. The manner in which the bus is controlled and operated is similar to that of a conventional bus and will be readily understood by those skilled in the art to which this invention pertains.

Having described my invention what I claim and desire to secure by Letters Patent is:

1. The combination in an automotive vehicle of front and rear axles, wheels upon said axles, a body structure supported from said axles including a flooring, an internal combustion engine mounted in a position beneath and closely adjacent to said flooring, said engine being constructed with horizontal cylinders and in such a manner as to have but a small depth, and a transmission mechanism for operatively connecting said engine to certain of said wheels including a change speed mechanism supported beneath said flooring in close proximity thereto, said change speed mechanism being constructed with a shifting mechanism arranged laterally at one side thereof and with its main shafts aggrouped in a substantially horizontal plane in order to reduce its depth.

2. The combination in an automotive vehicle of front and rear axles, a body structure supported from said axles including a flooring, a dry sump engine having horizontally disposed cylinders and a shallow oil receiving reservoir, and constructed in such a manner as to have a small depth, mounted beneath said flooring in a position closely adjacent thereto, and a transmission mechanism for operatively connecting said engine to certain of said wheels.

3. The combination in an automotive vehicle of front and rear axles, a body structure supported from said axles including a flooring, a dry sump engine having horizontally disposed cylinders and a shallow oil receiving reservoir, and constructed in such a manner as to have a small depth, mounted beneath said flooring in a position closely adjacent thereto, and a transmission mechanism for operatively connecting said engine to certain of said wheels including a change speed mechanism supported beneath said flooring in close proximity thereto, said change speed mechanism being constructed in such a manner that the main shafts thereof are arranged in a substantially horizontal plane, and being otherwise so constructed as to have but a small depth.

4. The combination in an automotive passenger vehicle of front and rear axles, wheels on said axles, a body supported from said axles including a flooring, said body and flooring extending the entire length of the vehicle and providing a central aisle of substantially unbroken level extending substantially from end to end of the vehicle, seats for passengers located on said flooring at either side of the aforesaid aisle, a dry sump engine having horizontally disposed cylinders and a shallow oil receiving reservoir, and constructed in such a manner as to have a small depth, mounted beneath said flooring in a position closely adjacent to the flooring in the aforesaid aisle, and a power transmission mechanism connecting said engine with certain of said wheels.

5. The combination in an automotive vehicle of front and rear axles, wheels upon said axles, a body structure supported from said axles including a flooring, an engine of small depth mounted in a position beneath and closely adjacent to said flooring, said engine being constructed with horizontal cylinders and with exhaust manifolding contained within the engine proper in order to reduce its vertical projection, and a transmission mechanism including a change speed mechanism of small vertical depth operatively connecting said engine to certain of said wheels.

6. The combination in an automotive passenger vehicle of front and rear axles, wheels on said axles, a body supported from said axles including a flooring, said body and flooring extending the entire length of the vehicle and providing a central aisle of substantially unbroken level extending substantially from end to end of the vehicle, seats for passengers located on said flooring at either side of the aforesaid aisle, an engine mounted in a position beneath and closely adjacent to the flooring in the aforesaid aisle, said engine being constructed with horizontal cylinders in such a manner as to have but a small vertical projection, and being provided with fuel intake apparatus which extends above the aforesaid flooring beneath seats at the opposite sides of the aforesaid aisle and which communicates through openings in the sides of the vehicle with the atmosphere, and a transmission mechanism for operatively connecting said engine to certain of said wheels including a change speed mechanism mounted beneath the flooring in the aforesaid aisle in a position closely adjacent thereto.

7. The combination in an automotive passenger vehicle of front and rear axles, wheels on said axles, a body supported from said axles including a flooring, said body and flooring extending the entire length of the vehicle and providing a central aisle of substantially unbroken level extending substantially from end to end of the vehicle, seats for passengers located on said flooring at either side of the aforesaid aisle, an engine mounted in a position beneath and closely adjacent to the flooring in the aforesaid aisle, said engine being constructed with horizontally opposed sets of cylinders in such a manner as to have but a small vertical projection, and being equipped with a pair of carburetors, one for each set of cylinders, which extend above said flooring beneath the seats at opposite sides of the aforesaid aisle, breathing conduits for said carburetors located beneath said last mentioned seats and leading to the outside of said vehicle, and a transmission mechanism for operatively connecting said engine to certain of said wheels including a change speed mechanism mounted in a position beneath and closely adjacent to said flooring.

8. The combination in an automotive passenger vehicle of front and rear axles, wheels on said axles, a body structure supported from said axles including a flooring, said flooring and body extending substantially the entire length of the vehicle and providing a central aisle of substantially unbroken level extending substantially from end to end of the vehicle, seats for passengers located on said flooring at either side of the aforesaid aisle, an engine with its crank shaft disposed in a longitudinal direction supported in a position beneath and closely adjacent to the flooring in the aforesaid aisle, said engine being constructed with horizontally disposed opposed sets of cylinders and with vertical inlet passages extending between the cylinders, and in such a manner as to have a small vertical projection, and being equipped with induction apparatus including a pair of inlet manifolds, one for each set of cylinders communicating with said inlet passages, a pair of carburetors respectively communicating with the aforesaid manifolds, one of which extends under a seat at one side of the aisle and the other of which extends under a seat at the opposite side of the aisle, and breathing conduits for said carburetors located beneath said last mentioned seats and leading to the outside of said vehicle, and a power transmission mechanism for operatively connecting said engine to certain of said wheels including a change speed mechanism mounted in a position beneath and closely adjacent to the flooring in said aisle.

9. The combination in an automotive passenger vehicle of front and rear axles, wheels on said axles, a body supported from said axles including a flooring, said flooring and body extending substantially the entire length of the vehicle and providing a central aisle of substantially unbroken level extending substantially from end to end of the vehicle, seats for passengers located on said flooring at either side of the aforesaid aisle, an engine with its crank shaft disposed in a longitudinal direction mounted in a position beneath and closely adjacent to the flooring in the aforesaid aisle, said engine being constructed with horizontally disposed cylinders in such a manner as to have but a small vertical projection, and being provided with cooling water passages, a radiator for the engine cooling water located in the front end of said vehicle above said flooring, means for conveying water from said radiator to the aforesaid passages in said engine, means for conveying water from the aforesaid passages to said radiator, means for producing a flow of water from said radiator to said engine and back to said radiator, a cooling fan arranged adjacent the rear side of said radiator and driven from said engine, a cover extending rearwardly from the sides and top of said radiator and encompassing said fan, said cover extending downward to the level of said flooring and communicating with an opening formed therein, and a power transmission mechanism operatively connecting said engine to the wheels on said rear axle including a change speed mechanism located in the rear of said engine in a position beneath and closely adjacent to said flooring.

10. The combination in an automotive passenger vehicle of a front axle, a rear axle comprising a housing for internal driving parts, wheels on said axles, a body including a flooring supported from said axles, said body and flooring extending the entire length of the vehicle and providing a central aisle of substantially unbroken level extending substantially from end to end of the vehicle, seats for passengers located on said flooring at either side of the aforesaid aisle, an engine mounted in a position closely adjacent the flooring in said aisle, said engine being constructed with horizontal cylinders in such a manner as to have but a small vertical extension, a change speed mechanism supported by said body in a position closely adjacent the flooring in the aforesaid aisle, driving mechanism connecting said engine with said change speed mechanism, a differential mechanism mounted in said rear axle housing beneath the flooring in the aforesaid aisle, and said axle housing being so constructed that the horizontal axis of said differential mechanism and the portion of the housing supporting it falls below the axis of the wheels mounted on the said axle, a driving shaft connecting said differential mechanism with said change speed mechanism, and driving mechanism connecting the driven parts of said differential mechanism to the wheels on said axle.

11. The combination in an automotive passenger vehicle of front and rear axles, wheels on said axles, a body supported from said axles including a flooring, said flooring and body construction extending the entire length of the vehicle and providing a central aisle of substantially unbroken level extending substantially from end to end of the vehicle, seats for passengers located on said flooring at either side of the aforesaid aisle, an engine with its crank shaft disposed in a longitudinal direction mounted in a position beneath and closely adjacent to the flooring in the aforesaid aisle, said engine being constructed with horizontally disposed cylinders in such a manner as to have but a small vertical projection and being provided with cooling water passages, a radiator for the engine cooling water located in the front end of said vehicle above said flooring, means for conveying water from said radiator to the aforesaid passages in said engine, and means for conveying water from the aforesaid passages to said radiator, an assembly of units located in the front end of said vehicle and driven by said engine, said assembly including a water pump for producing a flow of water from said radiator to said engine and back to said radiator, and a cooling fan for said radiator, and being equipped with a self contained circulatory lubricating system, a cover extending rearwardly from the sides and top of said radiator and encompassing the portion of the assembly which extends through said flooring including said fan, said cover extending downward to the level of said flooring and communicating with an opening formed therein, and a power transmission mechanism for operatively connecting said engine to the wheels on said rear axle.

12. The combination in an automotive vehicle of front and rear axles, wheels on said axles, a body supported from said axles by means of springs, said body comprising a pair of longitudinal girders embodied in its side walls and constituting the principal longitudinal stress resisting members of the super-structure of the vehicle, an under-structure comprising cross members connecting the sides of the body and serving to transfer to the aforesaid girders the major portion of the loads and stresses imposed on said under-structure, and a flooring supported by said under-structure, an engine mounted on said under-structure in a position beneath and closely adjacent said flooring, said engine being constructed with horizontal cylinders in a manner to have but a small vertical depth, and transmission mechanism for operatively connecting said engine to certain of said wheels.

13. The combination in an automotive vehicle of front and rear axles, wheels on said axles, a body supported from said axles by means of springs, said body comprising a pair of longitudinal girders embodied in its side walls and constituting the principal longitudinal stress resisting members of the super-structure of the vehicle, an under-structure comprising cross members connecting the sides of the vehicle and serving to transfer to the aforesaid girders the major portion of the loads and stresses imposed on said under-structure, and a flooring supported by said under-structure, an engine mounted on said under-structure in a position beneath and closely adjacent said flooring, said engine being constructed with horizontal cylinders in a manner to have but a small vertical depth, and a transmission mechanism for operatively connecting said engine to certain of said wheels including a change speed mechanism of small depth supported from said under-structure in a position closely adjacent to said flooring.

14. The combination in an automotive vehicle of front and rear axles, wheels on said axles, a body supported from said axle comprising a super-structure consisting of a lower portion in the form of a peripherally disposed plate girder construction, an upper portion including a roof supported above said plate girder construction, an under-structure comprising spaced longitudinally extending members of small vertical height located between the opposite sides of said plate girder construction, and cross structures connecting said members together and to the sides of said plate girder construction, flooring mounted on said under-structure, springs supporting said body from said axles, an engine supported by said longitudinally extending members in a position beneath and closely adjacent to said flooring, said engine being constructed with horizontal cylinders in such a manner as to have but a small vertical extension, and a transmission mechanism for operatively connecting said engine to certain of said wheels including a change speed mechanism of small vertical projection supported by said longitudinally extending members in a position beneath and closely adjacent to said flooring.

15. The combination in an automotive passenger vehicle of front and rear axles, wheels on said axles, a body supported from said axles including a flooring, said body and flooring extending the entire length of the vehicle and providing a central aisle of substantially unbroken level extending substantially from end to end of the vehicle, seats for passengers located on said flooring at either side of the aforesaid aisle, an internal combustion engine of small depth mounted in a position beneath and closely adjacent the flooring in said aisle, said engine being constructed with horizontal cylinders and with a dry sump lubricating system in order to reduce its depth, and a transmission mechanism for operatively connecting said engine to certain of said wheels including a change speed mechanism mounted beneath the flooring in said aisle in close proximity thereto, said change speed mechanism being constructed in such a manner that the main shafts thereof are arranged in a substantially horizontal plane, and being otherwise so constructed as to have but a small vertical extension.

16. The combination in an automotive vehicle, of a body comprising a flooring, a seat located on said flooring, an engine mounted in a position beneath and closely adjacent to said flooring, said engine being constructed with horizontal cylinders and in such a manner as to have but a small vertical projection, and being provided with fuel intake apparatus which extends above the aforesaid flooring beneath said seat, and a transmission mechanism for operatively connecting said engine to certain of said wheels including a change speed mechanism.

17. The combination in an automotive passenger vehicle of a front axle, a rear axle comprising a housing for internal driving parts, wheels on said axles, a body including a flooring supported from said axles, said body and flooring extending the entire length of the vehicle and providing a central aisle of substantially unbroken level extending substantially from end to end of the vehicle, seats for passengers located on said flooring at either side of the aforesaid aisle, an internal combustion engine of small depth mounted in a position beneath and closely adjacent said flooring, said engine being constructed with horizontal cylinders and with a dry sump lubricating system in order to reduce its depth, a change speed mechanism mounted in a position closely adjacent the flooring in the aforesaid aisle, and being otherwise so constructed as to have but a small vertical extension, driving mechanism connecting said engine with said change speed mechanism, a differential mechanism mounted in said rear axle housing beneath the flooring in the aforesaid aisle, and said axle housing being so constructed that the horizontal axis of said differential mechanism and the portion of the housing supporting it falls below the axis of the wheels mounted on the said axle, a driving shaft connecting said differential mechanism with said change speed mechanism, and driving mechanism connecting the driven parts of said differential mechanism to the wheels on said axle.

18. The combination in an automotive passenger vehicle of a body comprising a flooring, an engine for propelling said vehicle mounted under said flooring adjacent the passenger carrying portion of said vehicle, said engine being constructed with exhaust manifolding apparatus located at the bottom thereof in an exposed position, a circulatory water cooling system for said engine comprising an air cooled radiator and including as a part thereof a system of cooling water passages in said engine, said system of cooling water passages comprising passages adjacent said exhaust manifolding apparatus arranged to cool said apparatus with the result that the heat transferred into the passenger carrying portion of said vehicle from said engine is reduced and the likelihood of said apparatus being injured by sudden cooling by water or the like thrown up from the surface of the road is decreased, engine driven means for producing a flow of air through said radiator, and means for excluding the air passing through said radiator from the interior of said body.

19. The combination in an automotive passenger vehicle of a body comprising a flooring, an engine for propelling said vehicle mounted under said flooring adjacent the passenger carrying portion of said vehicle, said engine being constructed with exhaust manifolding apparatus located at the bottom thereof in an exposed position, a circulatory water cooling system for said engine comprising an air cooled radiator and including as a part thereof a system of cooling water passages in said engine, said system of cooling water passages comprising passages adjacent said exhaust manifolding apparatus arranged to cool said apparatus with the result that the heat transferred into the passenger carrying portion of said vehicle from said engine is reduced and the likelihood of said apparatus being injured by sudden cooling by water or the like thrown up from the surface of the road is decreased, and said radiator being mounted in a position to protrude above said flooring and being so arranged that forward motion of the vehicle produces a flow of air over its radiating surfaces, engine driven means for producing a large flow of air over the radiating surfaces of said radiator, and means for directing the air passing over the aforesaid radiating surfaces beneath the floor of said vehicle to aid in producing an air flow and a circulation of air over said floor.

20. The combination in an automotive vehicle of front and rear axles, wheels on said axles, a body supported from said axles including a flooring, an engine with its crank shaft disposed in a longitudinal direction mounted in a position beneath the aforesaid flooring and between the front and rear axles, said engine being constructed with horizontally disposed cylinders in such a manner as to have but a small vertical projection and being provided with cooling water passages, a radiator for the engine cooling water located in the forward end of the vehicle and extending above said flooring, means for conveying water from said radiator to the aforesaid passages in said engine, means for conveying water from the aforesaid passages to said radiator, a cooling fan arranged adjacent the rear side of the radiator, means for driving said fan from said engine comprising a longitudinally extending drive shaft connected at one end to the crank shaft of said engine and at its other end to said fan, means located at the rear of said radiator and joining with said floor designed to prevent the entrance in said body of air passing through said radiator, and a power transmission mechanism connecting said engine with certain of said wheels.

HAROLD D. CHURCH.